(12) United States Patent
Stevenson et al.

(10) Patent No.: US 9,321,019 B2
(45) Date of Patent: Apr. 26, 2016

(54) WINE BOTTLE AERATOR

(71) Applicants: Robert A. Stevenson, Canyon Country, CA (US); Wendy L. Stevenson, Canyon Country, CA (US)

(72) Inventors: Robert A. Stevenson, Canyon Country, CA (US); Wendy L. Stevenson, Canyon Country, CA (US)

(*) Notice: Subject to any disclaimer, the term of this patent is extended or adjusted under 35 U.S.C. 154(b) by 140 days.

(21) Appl. No.: 14/294,157

(22) Filed: Jun. 3, 2014

(65) Prior Publication Data

US 2015/0343400 A1 Dec. 3, 2015

(51) Int. Cl.
*B01F 3/04* (2006.01)
*B01F 13/00* (2006.01)
*C12G 1/00* (2006.01)

(52) U.S. Cl.
CPC ......... *B01F 3/04794* (2013.01); *B01F 3/04106* (2013.01); *B01F 3/04262* (2013.01); *B01F 13/002* (2013.01); *C12G 1/00* (2013.01); *B01F 2215/0072* (2013.01)

(58) Field of Classification Search
CPC .... B01F 3/04; B01F 3/04099; B01F 3/04106; B01F 3/04262; B67C 3/00; A23L 2/54
USPC .............. 261/77, 119.1, 121.1, 126; 426/474; 99/323.1
See application file for complete search history.

(56) References Cited

U.S. PATENT DOCUMENTS

| | | |
|---|---|---|
| 2,408,306 A | 9/1946 | Flournoy |
| 3,309,067 A | 3/1967 | Brewster |
| 4,494,452 A | 1/1985 | Barzo |
| 4,763,803 A | 8/1988 | Schneider |
| 5,154,112 A | 10/1992 | Wettern |
| 5,595,104 A | 1/1997 | Delaplaine |
| 2013/0292857 A1* | 11/2013 | Connors ............. B01F 3/04241 261/30 |

* cited by examiner

*Primary Examiner* — Robert A Hopkins
(74) *Attorney, Agent, or Firm* — Hackler Daghighian & Martino

(57) ABSTRACT

An aerator includes an expansion chamber. The expansion chamber is defined as having a top portion and a bottom portion. The bottom portion is configured to engage an opening of an uncorked wine bottle. The top portion is disposed above the opening of the uncorked wine bottle. The expansion chamber is configured to be in fluid communication with an inside of the uncorked wine bottle. A gas conduit has a proximal end in fluid communication with a distal end. The gas conduit passes through the bottom portion of the expansion chamber and the distal end is disposed below the bottom portion of the expansion chamber. The proximal end is disposed above the bottom portion of the expansion chamber. A gas source is in fluid communication with the proximal end of the gas conduit. The expansion chamber is configured to temporarily contain an expansion of wine bubbles during an aeration process.

23 Claims, 11 Drawing Sheets

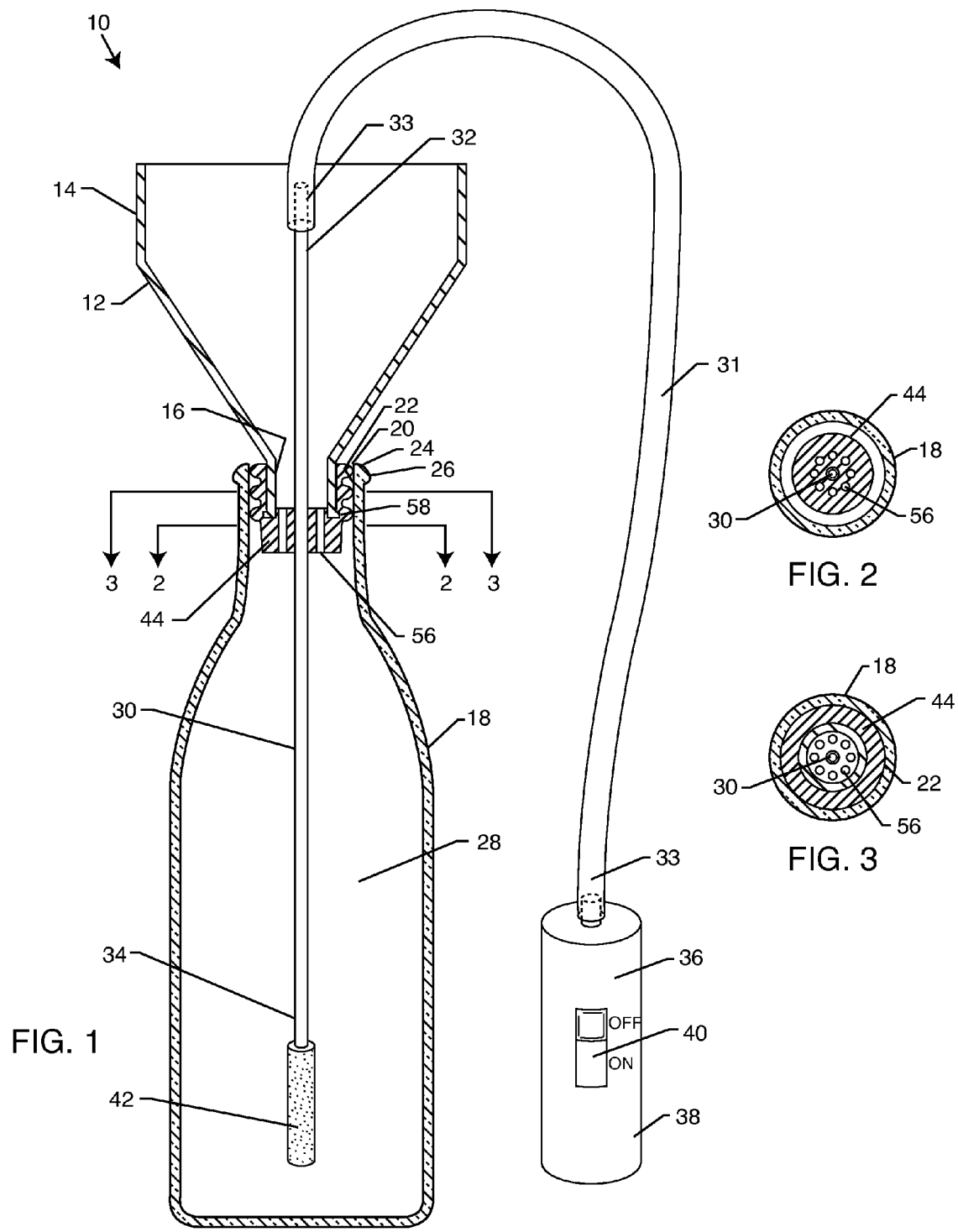

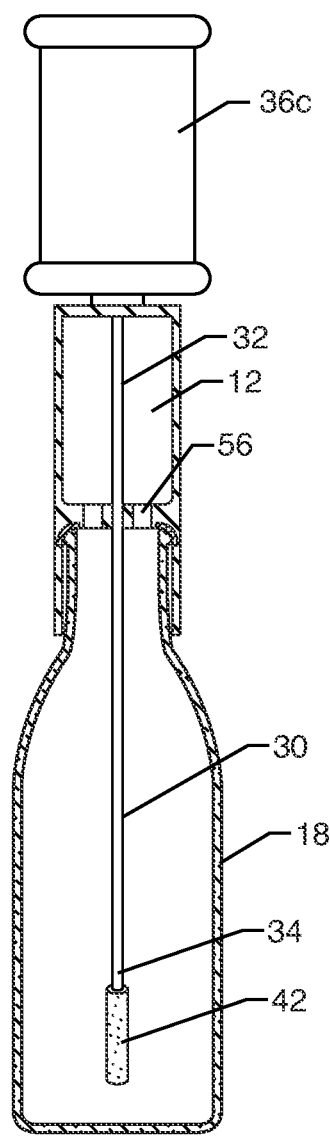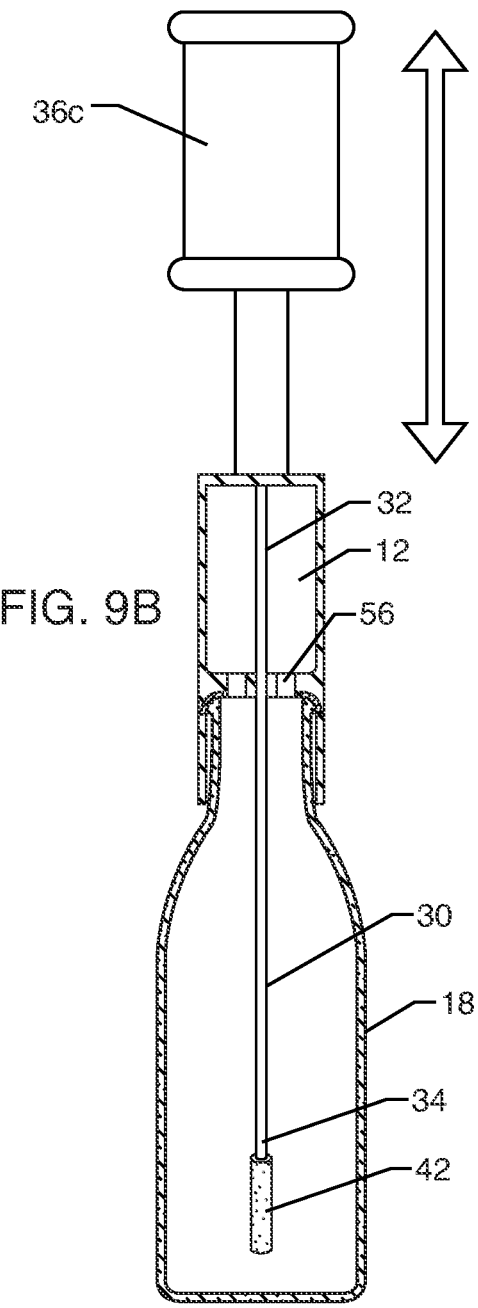

WINE BOTTLE AERATOR

CROSS-REFERENCE TO RELATED APPLICATIONS

None

FIELD OF THE INVENTION

The present invention generally relates to aeration of wine. More particularly, the present invention relates to device that aerates wine at an accelerated rate through the expansion and control of aeration bubbles.

BACKGROUND OF THE INVENTION

Decanting of red wine has been a long tradition in the wine industry. In decanting, the wine is simply poured into another container, usually one of clear glass or crystal. Decanting is particularly important for most young red wines (between three to ten years old). These younger wines can be harsh or astringent if consumed directly after opening the bottle. Such wines have this harsh character because red wine has been maintained in a relatively oxygen-free environment during aging in a bottle. Over time, this environment results in a closed character for the beverages that is derived from the accumulation of particular aroma compounds. A wine's aroma will change during the first ten to thirty minutes after the bottle is opened. Decanting accelerates the breathing process, which increases the wine's aromas from natural fruit and oak by allowing a few volatile substances to evaporate. Decanting also softens the taste of tannins that cause harshness and astringency in young wines. In older red wines, the tannin reactions have proceeded long enough to reduce astringency. As a result, the taste is not as harsh when the wine is drunk straight out of the bottle. In comparison to reds, white wines have little tannin and are not aged in bottles for very long before serving. Thus, they have very little opportunity to develop bottle aromas that need evaporation. Instead, their natural fruit aromas more specifically define their taste. There are however, a number of white wines that can benefit from decanting, or specifically aeration.

Decanting a young wine (particularly one with no sediment) involves pouring the wine into another decanter and letting it sit for twenty minutes or so before you serve it and you will likely notice a dramatic increase in subtlety and complexity. If you have the luxury of time, one can continue tasting the wine over a period of hours. Many wines keep evolving and improving over time. Some experts believe that decanting all types of wines from Bordeaux to Burgundy and even whites can beneficially affect the wine.

Most wines produced today have been routinely fined and filtered to a crystal clear state. In the past, it was quite common for wines poured from both barrel and bottle to contain a considerable amount of solid matter (sediments). However, most wines on the shelves today have gone through a filtering process and are substantially clear.

Of course the problem with decanting is that it takes a substantially long period of time for the oxygen to work its miraculous effects on the taste of the wine. If one knows, for example, a day in advance that they are going to be having a meal with a particular type of wine, the wine may be uncorked and decanted as much as a day before. Some experts have recommends the following process for properly drinking a bottle of red wine: First, chill the red wine in a refrigerator for at least two hours. Second, uncork the bottle of wine and decant it. Allow it to come back to room temperature over a period of hours. Third, taste and then drink the wine. The process of warming back up tends to pull more oxygen in from the surrounding air thereby refining the wine. The inventors have actually done this process and it works amazingly well.

However, all of this historical decanting and ritual that one goes through ignores the simple physics. It is really only the act of pouring the wine from one bottle to the other that has any real meaningful effect as this is when surface tension is broken up and oxygen from the surrounding air actually has a chance to interact with wine molecules. Once the wine is decanted and sitting again in a calm state, there is a surface tension across the surface of the fluid thereby making gas exchange a very slow and long process.

Accordingly, there is a need to rapidly aerate wine and perfect an oxygen exchange to remove the astringent taste and reduce the tannin levels. U.S. Pat. No. 4,785,724 to Vassallo describes an apparatus for aerating bottled wine. Referring to FIG. 1 of Vassallo, one can see a wine bottle 1 which is full of wine and an aeration tube 20, 21 disposed into the bottle of wine terminating at a distal end 22 in a structure with fine holes to break up the air flow into final bubbles. The problem with the Vassallo invention is that the air flow rate through the tube 20, 21 has to be extremely low so that the wine does not form bubbles and froth out the top and create a mess all over the base unit 2. The inventors have experimented with such techniques and have found that this is no more efficient than decanting. In other words, it can take up to 20 minutes by very slowly putting bubbles into the wine and creating a slight surface agitation such that the wine will not froth out of the bottle.

Reference is also made to U.S. Pat. No. 5,154,112 to Wettern. In the Wettern invention, there is a manual pump disposed over the top of the wine bottle which one manually compresses. Referring to FIGS. 1 and 2 of the '112 patent, one can see the end of the pump 8 and a seating collar 13 where it sits on the neck of the wine bottle. Referring to FIG. 2, one can see the manual pump in cross-section and one can see the area 13 and note that there is not a liquid tight seal formed. This means that as air is injected down into the wine bottle, as shown in FIG. 1, it would have to be an extremely low flow rate. If a bubble froth was formed, that would mean that liquid and bubbles would escape between the neck of the wine bottle and the collar 13 which only loosely rests on the end of the wine bottle. This is a major deficiency of the invention as previously described in the Vassallo '724 patent. In other words, the Wettern invention would only work at extremely low flow rates.

Another wine bottle aerator is described in U.S. Pat. No. 5,595,104 to Delaplaine. FIG. 1 of Delaplaine shows an air pump housing 12, a sealing apparatus 14, an extension tube 16 and an end with aeration holes 18. There is an air escape hole 24, as shown. The '104 patent suffers from all of the same deficiencies as described in the Vassallo and Wettern patents. The deficiency is the air flow out of the distal tip 18 would have to be extremely low such that a bubble and froth wasn't created, which would cause wine to overflow the outside of the wine bottle and pour, for example, down onto a countertop.

U.S. Pat. No. 8,561,970 to Mills, et al. describes another type of low volume aeration system. The Mills, et al. aeration system does not have an expansion chamber and is therefore, by definition a low volume system. This is in marked contrast to the present invention, which is a high volume aeration system able to achieve complete aeration and reduction of tannins in the wine in less than 10 seconds. All of the aforementioned prior art requires at least several minutes of aeration at a very slow rate. The reason for this is simple physics. If one drives a very high volume of gas, such as air or oxygen into the bottle of a bottle of wine, a great deal of bubble formation and froth will immediately occur. Unless there is an expansion chamber, this froth will spill over the top of the wine bottle and create a mess.

Accordingly, there is a need for a device that can aerate wine at an accelerated rate. The present invention fulfills these needs and provides other related advantages.

SUMMARY OF THE INVENTION

An exemplary embodiment of an aerator of the present invention includes an expansion chamber. The expansion chamber is defined as having a top portion and a bottom portion. The bottom portion is configured to engage an opening of an uncorked wine bottle. The top portion is disposed above the opening of the uncorked wine bottle. The expansion chamber is configured to be in fluid communication with an inside of the uncorked wine bottle. A gas conduit has a proximal end in fluid communication with a distal end. The gas conduit passes through the bottom portion of the expansion chamber and wherein the distal end is disposed below the bottom portion of the expansion chamber while the proximal end is disposed above the bottom portion of the expansion chamber. A gas source is in fluid communication with the proximal end of the gas conduit. The expansion chamber is configured to temporarily contain an expansion of wine bubbles during an aeration process.

In other exemplary embodiments, the expansion chamber may be optically transparent or translucent.

A sealing element may be attached to the bottom portion of the expansion chamber, wherein the sealing element is configured to seal against an inside surface, a top surface or an outside surface of the opening of the uncorked wine bottle. The sealing element may be an elastic or rubber-like material. The sealing element may be configured to be disposed between the expansion chamber and the opening of the uncorked wine bottle.

An aeration element may be attached to the distal end of the gas conduit.

A portion of the expansion chamber may be in fluid communication with surrounding air. The top portion of the expansion chamber may be larger in cross-sectional area as compared to the bottom portion of the expansion chamber.

The gas source may be an electrically powered air pump, a manually powered air pump or a pressurized cartridge. The electrically powered air pump may be electrically powered by a battery or by an electrical plug.

An extension may be attached to the expansion chamber, where the extension is configured to extend downwardly around a neck of the uncorked wine bottle.

The gas source may be disposed remote from the expansion chamber or the gas source may be attached to a portion of the expansion chamber.

Another exemplary embodiment of an aerator of the present invention includes a gas conduit having a proximal end in fluid communication with a distal end, where the distal end is configured to be disposed within an inside an uncorked wine bottle and the proximal end configured to be disposed outside the uncorked wine bottle. An expansion chamber is configured to engage an opening of the uncorked wine bottle, wherein the expansion chamber is at least partially disposed outside the uncorked wine bottle and wherein the expansion chamber is configured to be in fluid communication with the inside of the uncorked wine bottle and also in fluid communication with surrounding air. Also, the gas conduit is at least partially disposed within the expansion chamber.

Another exemplary embodiment of an aerator of the present invention includes an expansion chamber configured to be in fluid communication with an inside of an uncorked wine bottle, wherein at least a portion of the expansion chamber is disposed outside the uncorked wine bottle and in fluid communication with surrounding air. A gas conduit is attached to the expansion chamber. The gas conduit has a proximal end in fluid communication with a distal end, the distal end configured to be disposed within an inside of the uncorked wine bottle and the distal end comprising an aeration element. The proximal end of the gas conduit is configured to be disposed outside the uncorked wine bottle.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 1 is a sectional side view of an exemplary embodiment of an aerator of the present invention;

FIG. 2 is a sectional view taken from lines 2-2 from the structure of FIG. 1;

FIG. 3 is a sectional view taken from lines 3-3 from the structure of FIG. 1;

FIG. 9A is a sectional view of another embodiment of an aerator with a manual air pump in the down position;

FIG. 9B is the structure of FIG. 9A now showing the manual air pump in the up position.

DETAILED DESCRIPTION OF THE PREFERRED EMBODIMENTS

Figure 4:
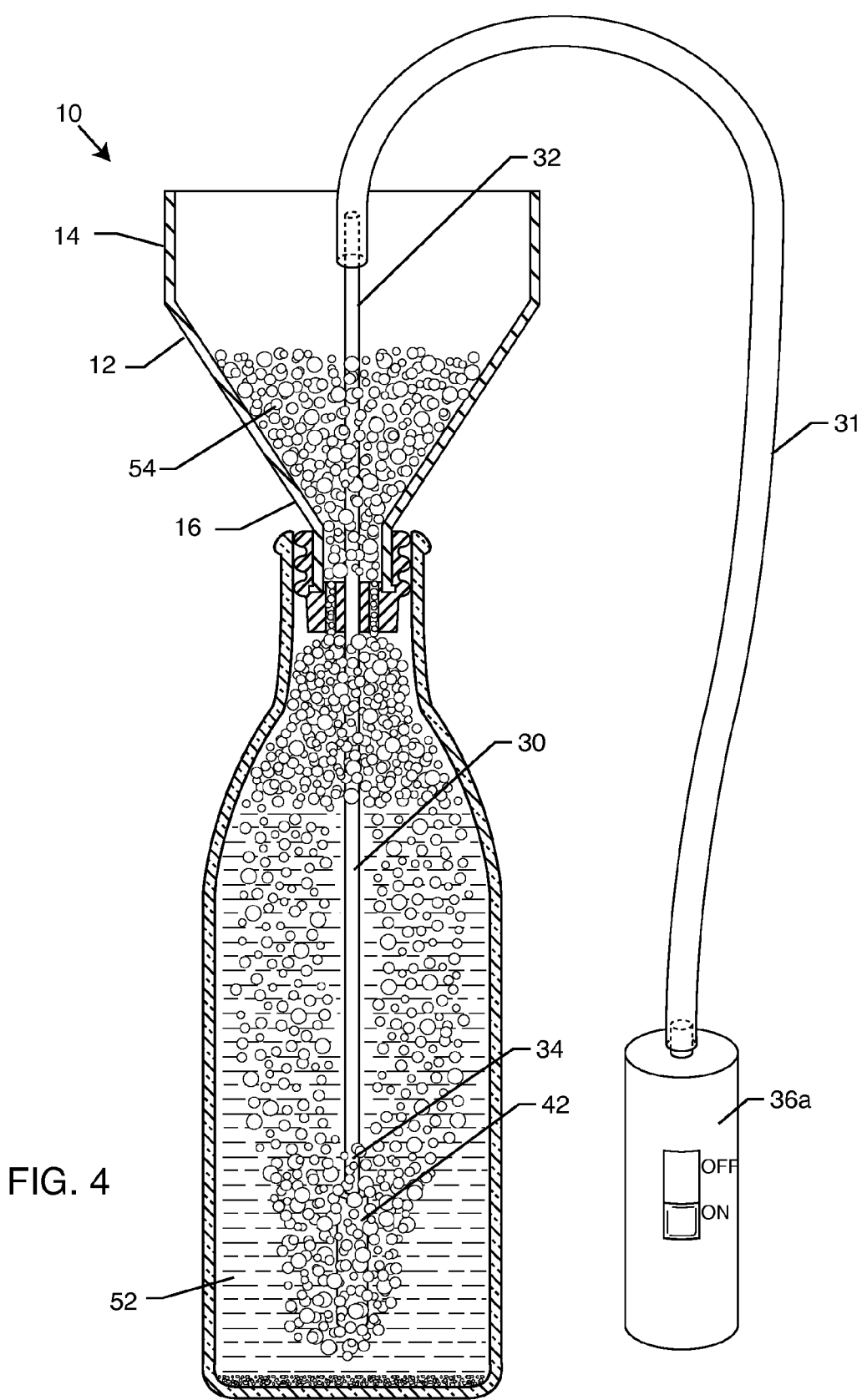
FIG. 4 is a sectional view similar to FIG. 1 now showing wine being aerated and expanding into an expansion chamber.

FIG. 1 illustrates a cross-section of a wine bottle 18 with an aerator 10 of the present invention. Most wine bottles 18 are a standard 750 ml. However, there are magnum bottles and even super magnum bottles, which may have different neck sizes. Shown, is an expansion chamber 12 in accordance with the present invention. The expansion chamber 12 has a top portion 14 and a bottom portion 16 which is necked down to fit into the opening 20 of the bottle 18. A sealing element 44, such as a rubber seal, is shown such that fluid and or bubbles cannot escape and flow down the outside of the wine bottle

18. As shown here, the sealing element 44 is in contact with an inside surface 22 of the bottle opening 20. A sealing element 44 could also be configured to seal to a top surface 24 of the bottle opening 20 or to an outside surface 26 of the bottle opening 20.

There is a gas source 36 shown, which may be an air pump 36a, a compressed air source 36b (a compressed oxygen source or CO2 source) or a manual air pump 36c. Shown here is an on/off switch 40. In this particular embodiment, the gas source 36 is self-contained and has an internal battery 38 or could be connected to an electrical outlet via an electrical cable and plug (not shown). The gas flow is directed through gas conduit 30 from the proximal end 32 to the distal end 34. Shown here the air conduit 30 has a flexible extension 31 that allows the gas source 36 to be placed remotely from the expansion chamber 12 and bottle 18.

At the distal end 34 of the gas conduit 30 is a fine aeration element 42. This aeration element 42 could be constructed of a stainless steel cylinder with multiple small perforations, or an alcohol-resistant stone structure such that micro-bubbles are formed at a high flow rate.

As gas pressure is introduced into an inside 28 of the bottle 18 as best seen in FIG. 4. The pressure on the inside 28 of the bottle 18 will tend to increase along with the formation of a large amount of froth and bubbles 54 from the wine 52. Passageways 56 allow these bubbles and froth to collect on the inside of the expansion chamber 12. This process is so fast that several inches of froth will develop in just a few seconds. Referring once again to sealing element 44, one will see that it has a catch 58 which is part of the expansion chamber 12 so that the rubber stopper/sealing element 44 will not easily or mistakenly slide off.

Figure 4A:
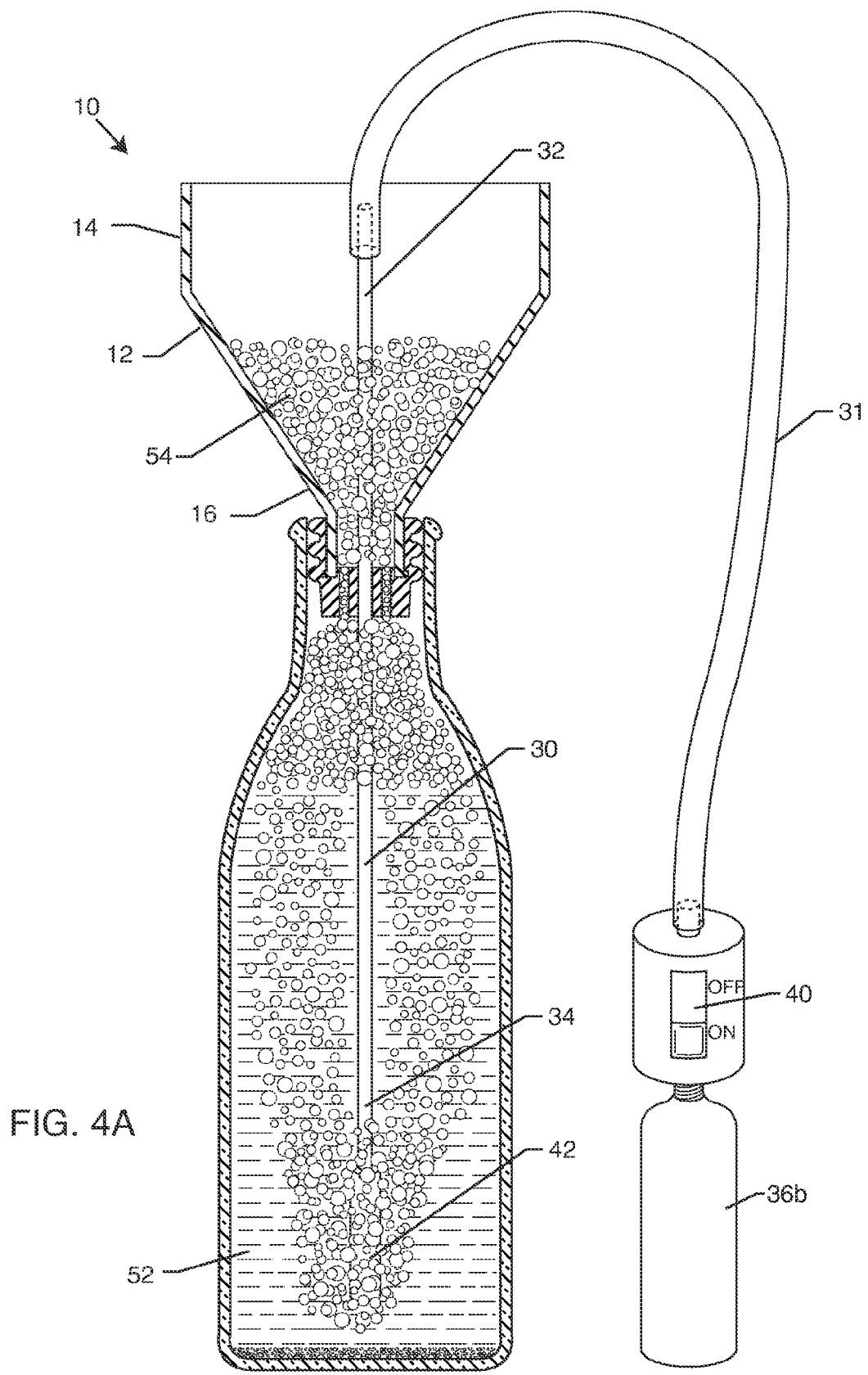
FIG. 4A is a view similar to FIG. 4, where now the gas source is a compressed canister.

Referring once again to the gas source 36, it can be a self-contained battery operated air pump or use electrical cord (not shown). As another embodiment of the gas source 36, it could even be a self-contained compressed gas source 36b as best shown in FIG. 4A. The compressed gas source 36b could be a CO2 canister, compressed air canister or compressed oxygen canister. The canister can be screwed into or connected to the switch 40.

Referring once again to FIG. 1, the expansion chamber 12 could be made of many different materials. In a preferred embodiment, the expansion chamber 12 would be translucent so one could enjoy the effect of watching the wine 52 froth build up and then dissipate back down into the bottle 18. Of course, this could also be stainless steel, plastic or any other material suitable material. In one preferred embodiment, this would be of a crystalline glass structure and can even be etched with some grapes or other ornamentation.

Referring again to FIG. 1, the tubing material 31, in a preferred embodiment, would be a clear type of surgical or food-grade tubing. It would have a slip-fit 33 onto the end of the rigid proximal end 32 of the gas conduit 30. At the distal end 34 of the gas conduit 30 would be the aeration element 42. The gas conduit itself 34 could be of glass, stainless steel, or the like. In a preferred embodiment, the material would be stainless steel to provide mechanical strength. It is also noted herein that the gas conduit 30 is preferred to be rigid, but could also be a flexible gas conduit 30 as well.

FIGS. 2 and 3 are taken from FIG. 1 and show how the sealing element 44 functions. In FIG. 2, on can see the passageways 56 through the sealing element 44 that connect the expansion chamber 12 and the inside 28 of the bottle 28 in fluid communication. Also seen is the air conduit 30 passing there through. FIG. 3 shows how the sealing element 44 is sealed against the inside surface 22 of the bottle 18.

FIG. 4 dramatically illustrates one difference in the present invention over all of the other prior art. As one can see, the volume of gas flow injected at or near the bottom of the wine bottle 18 is extremely high producing a huge bubble formation and froth 54, which is temporarily collected in the expansion chamber 12. This whole process is amazingly quick. The inventors have demonstrated that all it takes to completely remove the tannins and astringent properties of a wine 52 is just a few seconds of high volume bubbling like this. This is in stark contrast with all of the other prior art where the bubble formation is so low it will not overflow the container. The flow rates of the present invention tend to be at least an order or magnitude greater than the prior art. The inventors have done a set of very interesting experiments using the configuration shown in FIG. 4. These experiments have been performed by pinching down the flexible extension tube 31, wherein, no expansion chamber 12 was used. In other words, the inventors wanted to see if a very small amount of air bubble formation could be produced, such that the wine would not overflow the top of the wine bottle. This was found to be the case. By reducing the air flow down to a relatively miniscule amount, the bubble formation 54 can be reduced to the point where the bubbles do not overflow the top of the wine bottle 18. However, experimentation has shown that one must do this for at least several minutes to properly aerate the wine and as much as 10 to 20 minutes in some cases. This makes this pinching technique hardly any more efficient than the old method of decanting.

Again, in the present invention, there is such a huge bubble formation that occurs in just a few seconds that tremendous surface area is created which is then captured and contained by the expansion chamber 12. Surface area is created around the outside of each bubble that's formed in the expansion chamber 12 and also the inside of each bubble. In other words, gas or air is in contact with an enormous surface area of the wine 52. Double blinded testing in large groups of people has repeatedly shown that the high volume approach has a remarkable effect on the aroma, taste, and reduction of tannins of almost all wines. The present invention is so effective, it also removes astringency from any white wines.

Figure 5:
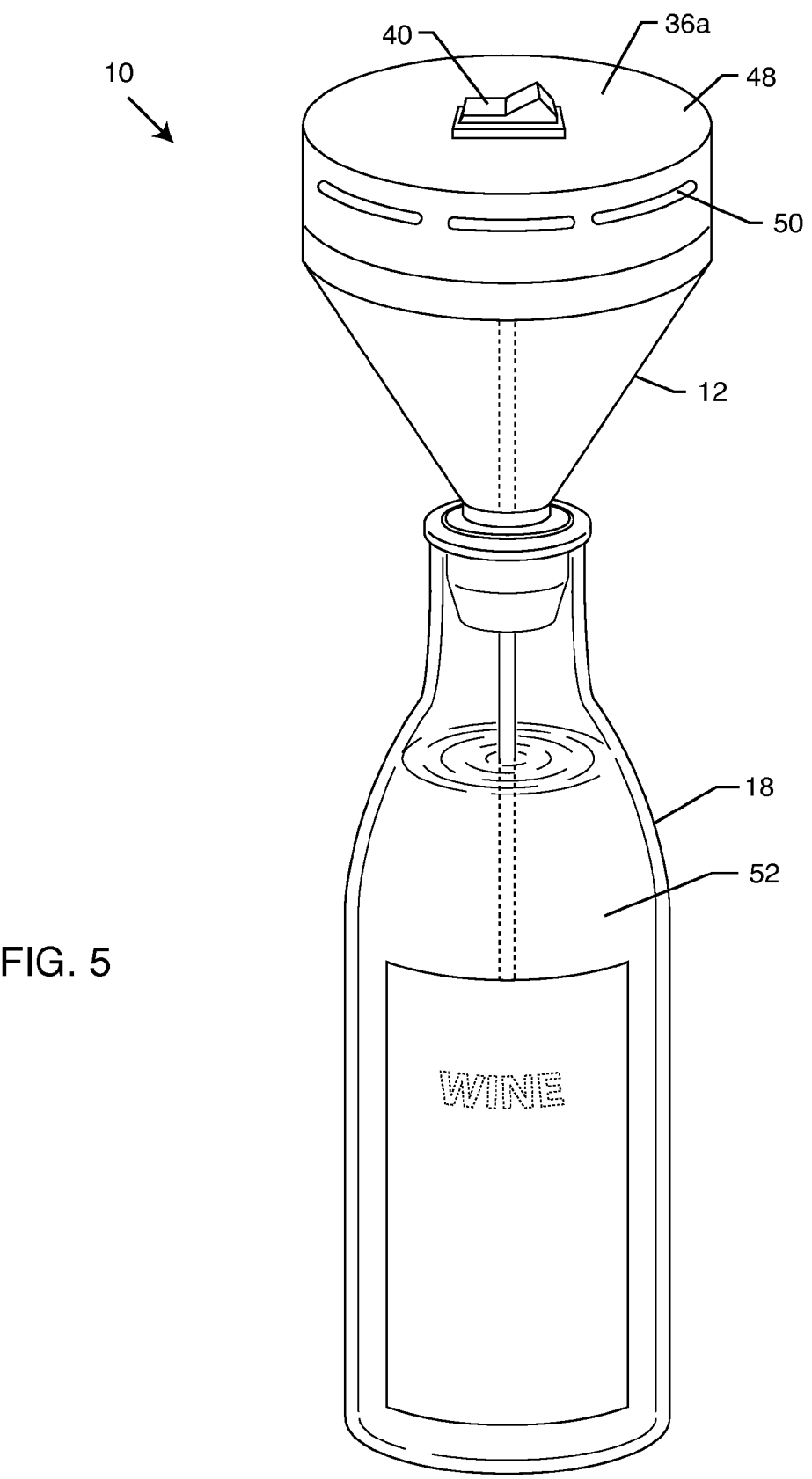
FIG. 5 is a perspective view of another exemplary embodiment of an aerator of the present invention.

FIG. 5 illustrates an alternative embodiment of the present aeration invention 10 showing a wine bottle 18, where the air pump 36a is integral to the expansion chamber 12. As one can see in FIG. 5, there is a switch 40 on the top of the housing 48 and batteries (internal) and an internal air pump with a vent 50 to allow excess gas pressure to escape during the wine bubble 54 formation in expansion chamber 12.

Figure 6:
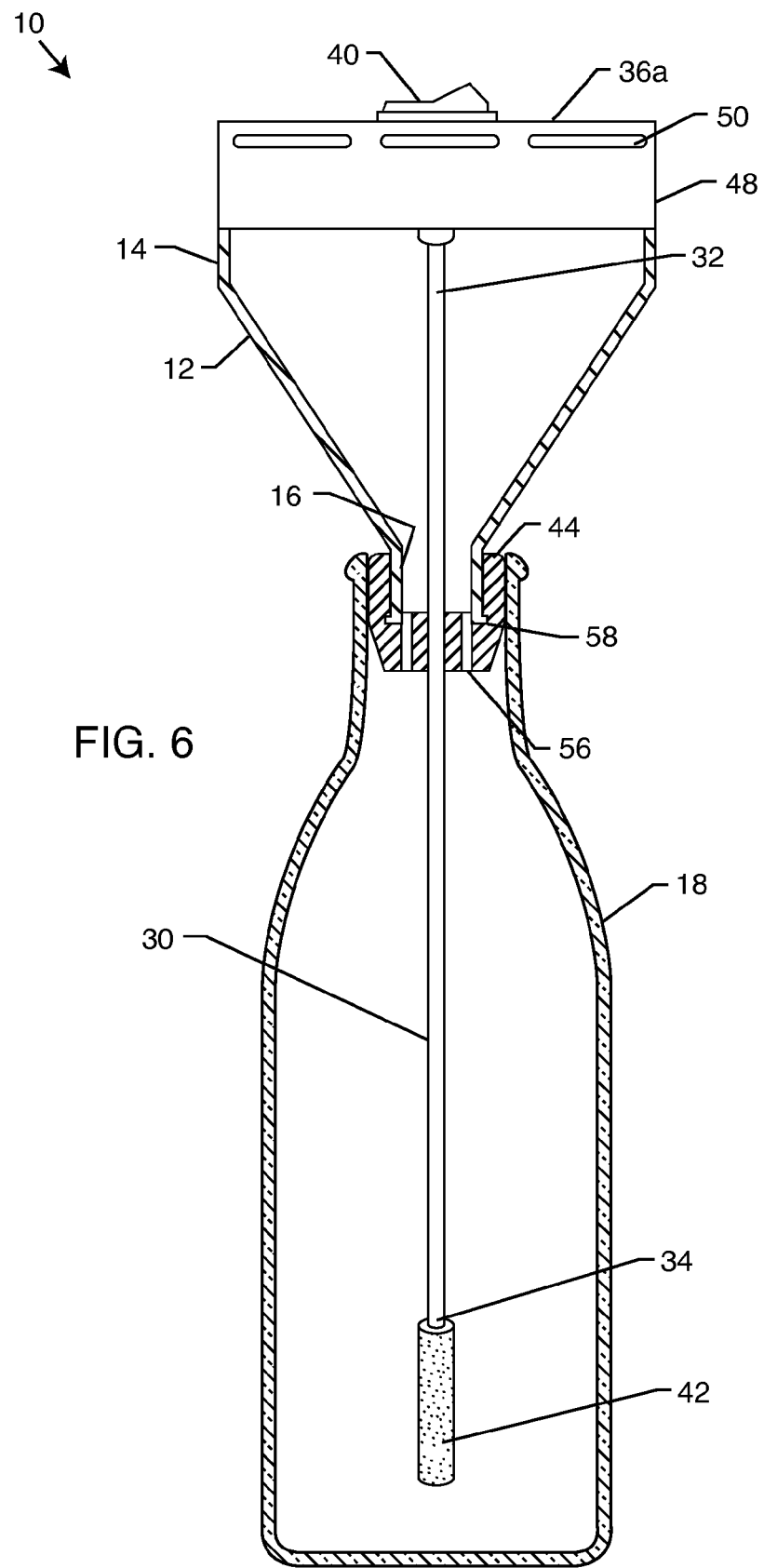
FIG. 6 is a sectional view of the structure of the FIG. 5.

FIG. 6 is a cross-sectional view taken from FIG. 5 showing that the proximal end of the gas conduit 32 is fitted into the end of the removable gas pump housing 48.

Figure 6A:
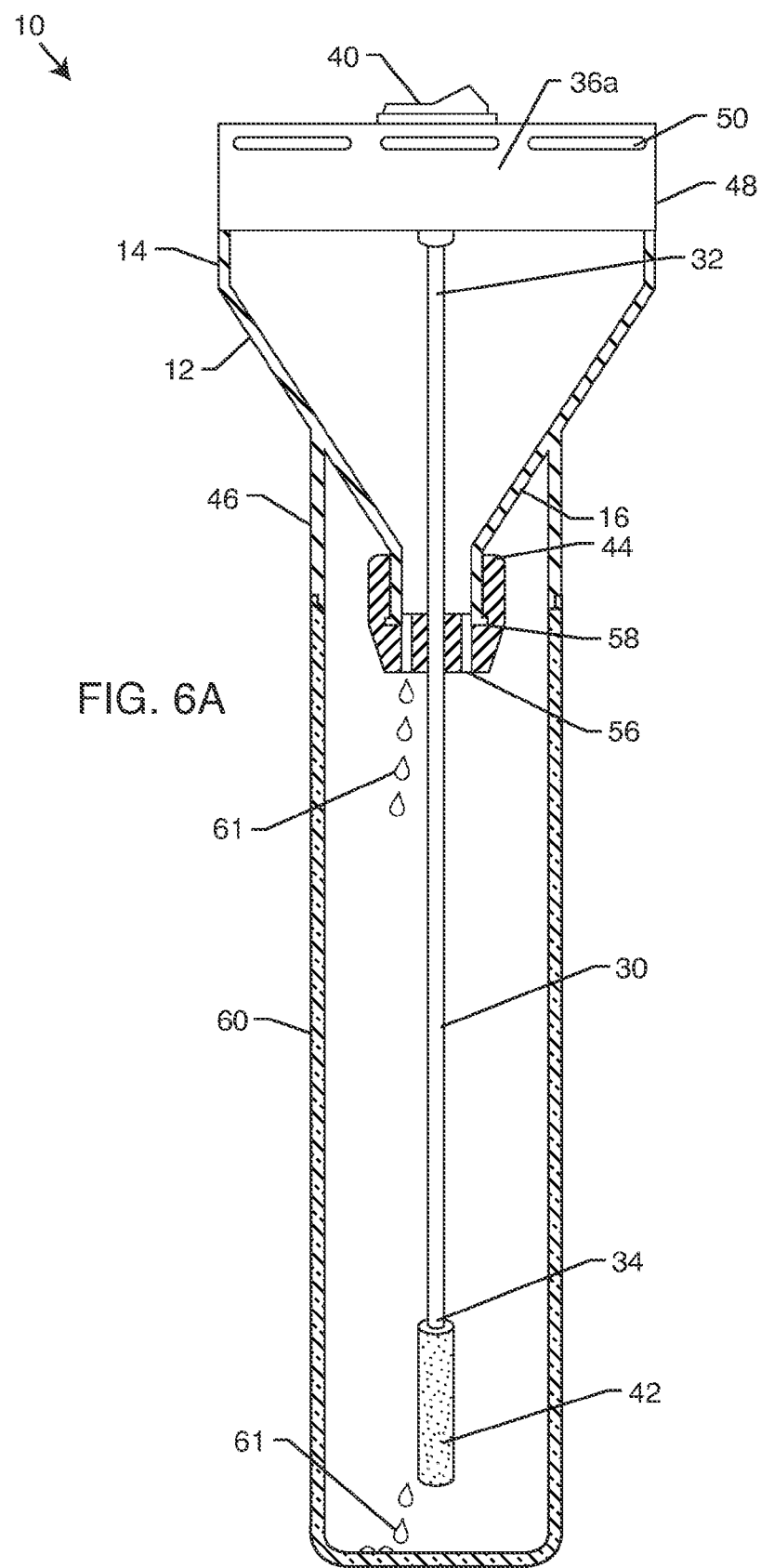
FIG. 6A is a view similar to FIG. 6 now showing an embodiment with a case.

FIG. 6A shows the modification to the expansion chamber 12 including an extension 46 which allows the entire air pump assembly 48 and gas conduit 30 to be inserted into a convenient storage case 60. In a preferred embodiment, the storage case 60 would be of stainless steel or even of clear crystalline glass. The storage case can be adapted to any of the drawings of the present invention and serves several very important functions. First, it provides a convenient way to transport the aerator 10 to a table in a restaurant. Second, after completion of the wine aeration, it provides a convenient place in which to quickly insert the wine aeration assembly 10 and gas conduit 30 such that any drips 61 that would emanate from the distal end 34 of aeration element 42 to then collect in the bottom of the case 60 where it could be easily wiped out. Drips 61 could also come from the passageways 56, as shown. Again, the case 60 could be made of any material, including plastics and the like.

Figure 7:
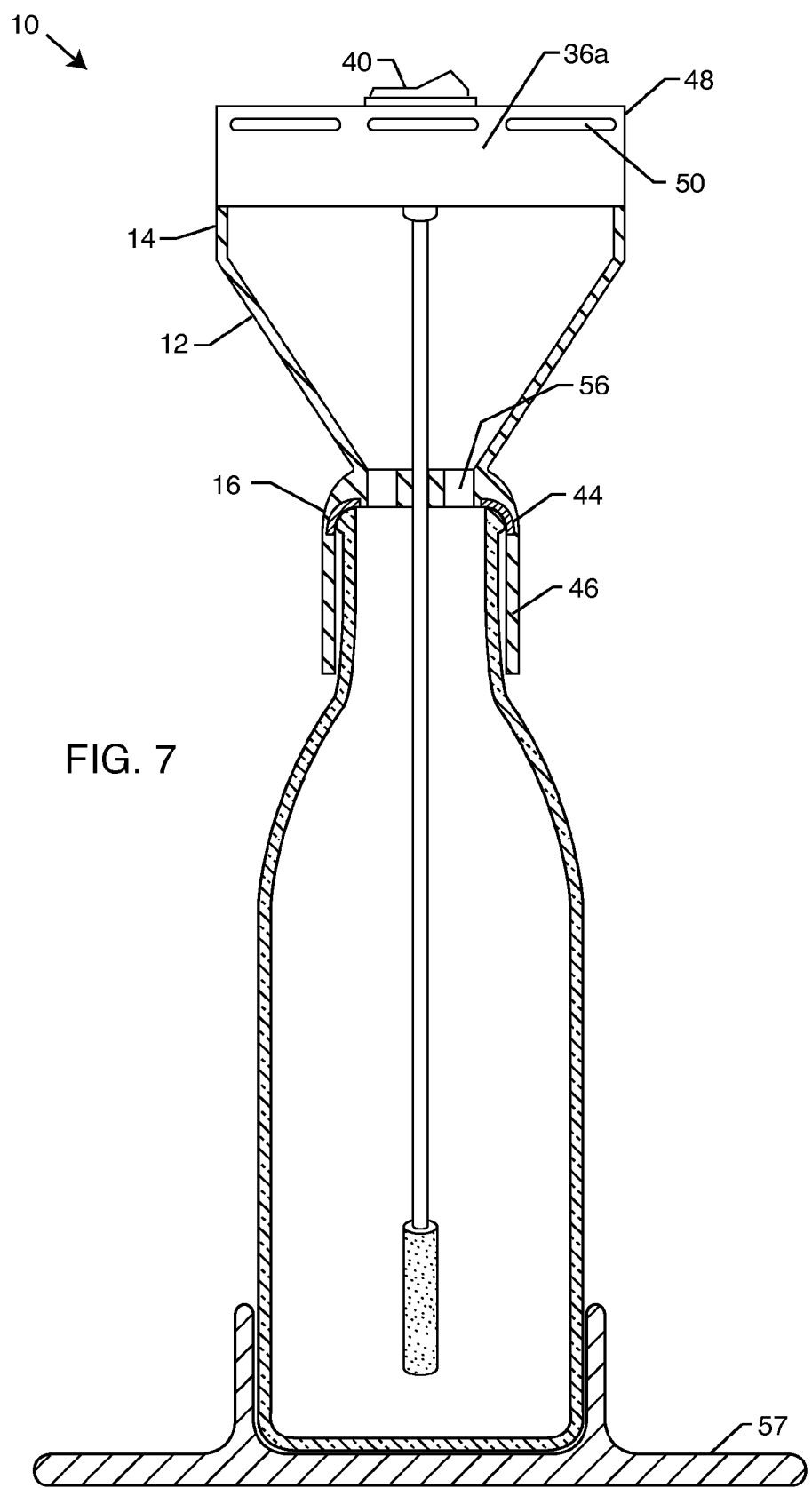
FIG. 7 is a sectional view of another exemplary embodiment with a different sealing element and a base.

FIG. 7 is very similar to the apparatus previously described in FIG. 6, except that in this case, there is an extension 46 that extends over the neck of the wine bottle 18. This provides some structural stability to avoid tipping of the aeration assembly 10 when in use. In this case, the sealing element 44 abuts to the outside surface 26 of the wine bottle opening 20, which fits tightly in place so that the froth and bubble formation 54 from FIGS. 4 and 4A will not leak down the outside of the wine bottle 18. Also shown is an optional base 57 into which the wine bottle can be inserted to further prevent tipping. This base piece 57 could be of glass, stainless steel, a plastic ring or the like.

Figure 7A:
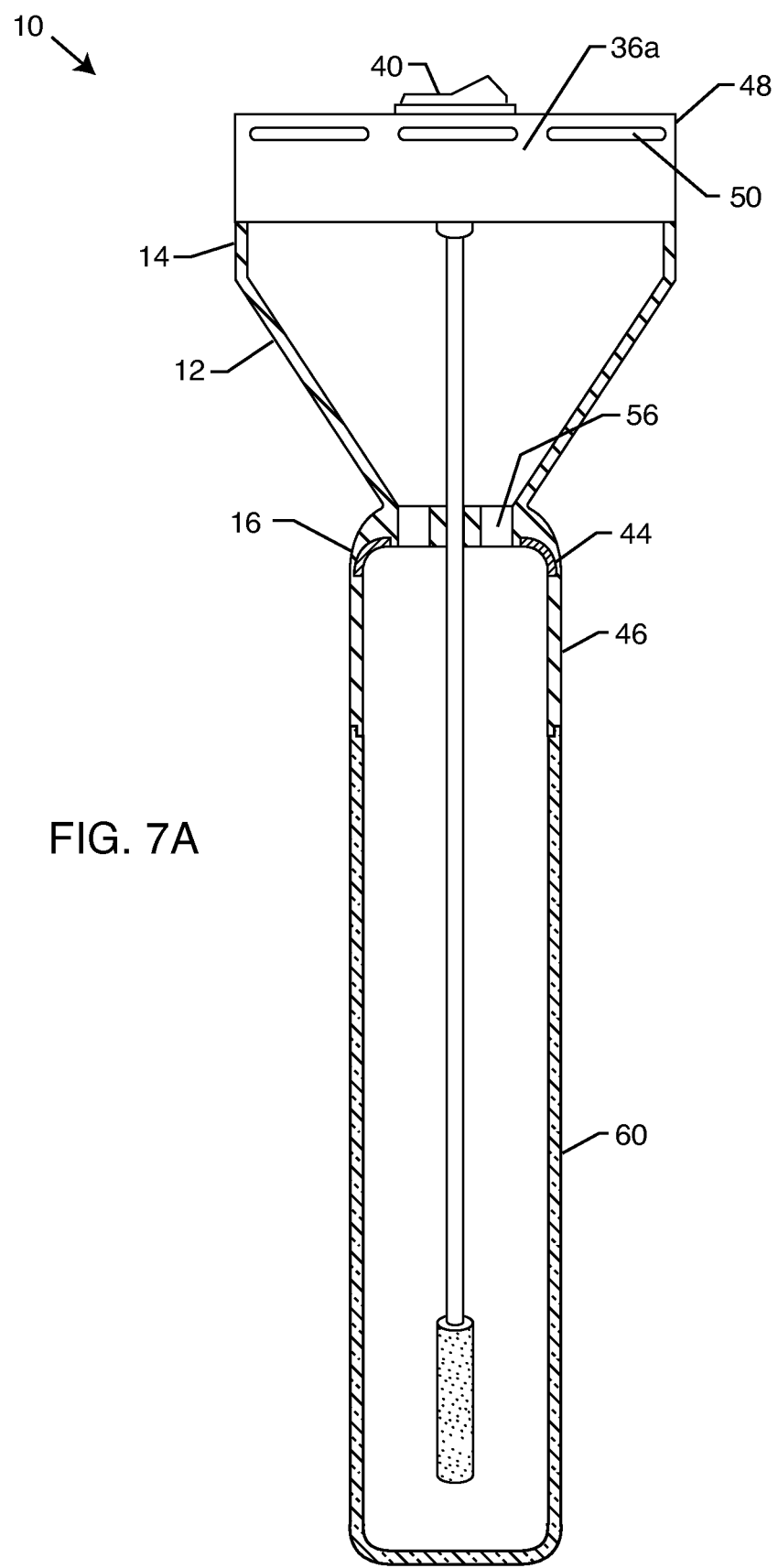
FIG. 7A is a view similar to FIG. 7 now showing the aerator with a case.

FIG. 7A is very similar to FIG. 7, except that it is shown mated with a case 60 as previously described in FIG. 6A.

Figure 8:
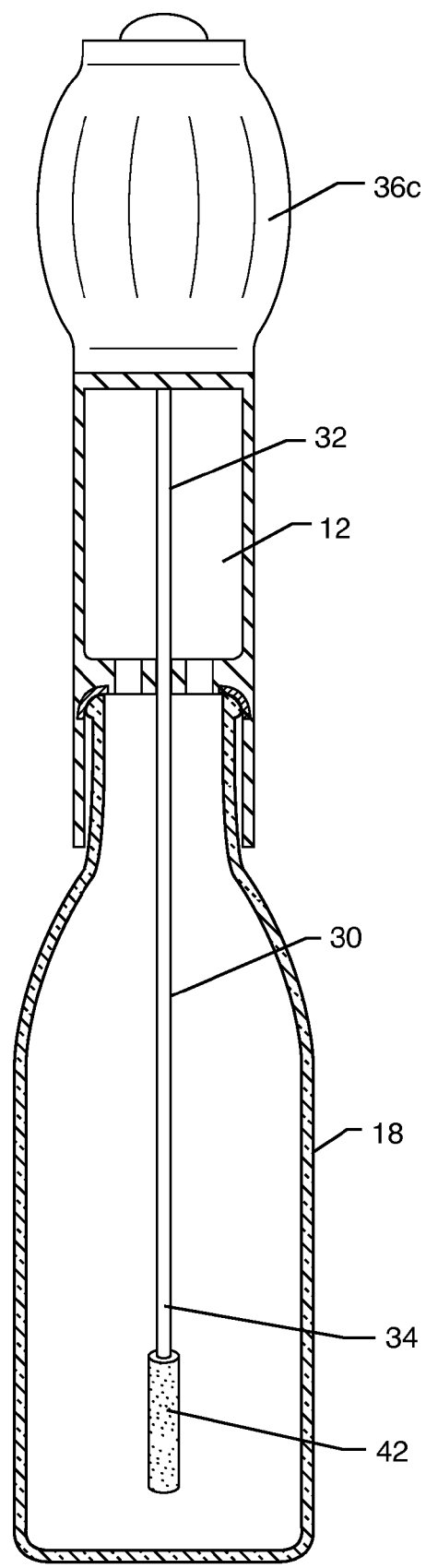
FIG. 8 is a sectional view of another embodiment of an aerator with a manual air pump.

FIG. 8 is very similar to FIG. 7, except that the electrically operated pump structure 36a has been replaced by a manual squeeze ball pump 36c. When a user squeezes the ball pump 36c, air is forced through the gas conduit 30 from the proximal end 32 to the distal end 34 and out through the aeration element 42. In this case, the expansion chamber 12 is shown below the squeeze ball 36. The expansion chamber 12 is cylindrical in shape as compared to the previous cone shapes. It is understood that the expansion chamber 12 may take a variety of shapes and configurations and this disclosure is not limited to the precise forms described herein.

FIGS. 9A and 9B illustrate that the squeeze ball 36 of FIG. 8 could be replaced by a manual piston-type air pump 36c, as illustrated. The piston-type pump 36c may provide pressure and gas through the gas conduit 30 on either one motion of direction (typically going downward) or even both directions of motion through the use of various one-way valves.

Figure 10:
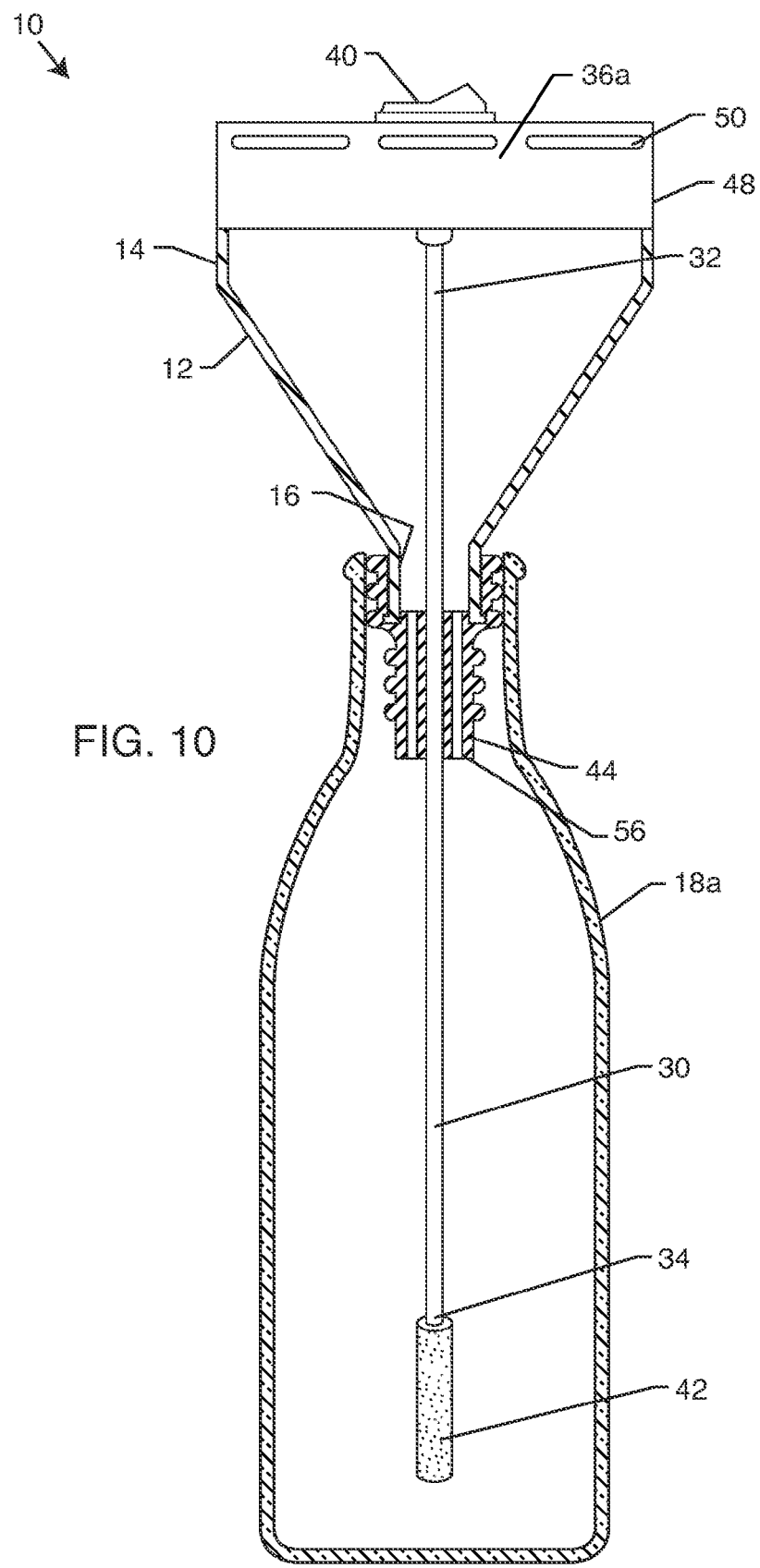
FIG. 10 is a sectional view of another exemplary embodiment of an aerator now with a sealing element configured to seal into different sized wine bottles.

FIG. 10 shows that the sealing element 44 can comprise a variety of shapes such that it is insertable and sealable into both the standard 750 mL wine bottles 18 and even larger wine bottles 18a as shown herein. The sealing element 44 has at least two sizes of seals that are configured to engage into at least two sized of wine bottles 18 and 18a.

The use of fluid communication as used herein describes the ability to transport gases and/or liquids and is not limited to the transportation of just liquids. Although several embodiments have been described in detail for purposes of illustration, various modifications may be made to each without departing from the scope and spirit of the invention. Accordingly, the invention is not to be limited, except as by the appended claims.

What is claimed is:

1. An aerator, comprising:
    an expansion chamber defined as having a top portion and a bottom portion, wherein the bottom portion is configured to engage an opening of an uncorked wine bottle, wherein the top portion is disposed above the opening of the uncorked wine bottle, and wherein the expansion chamber is configured to be in fluid communication with an inside of the uncorked wine bottle;
    a gas conduit having a proximal end in fluid communication with a distal end, wherein the gas conduit passes through the bottom portion of the expansion chamber and wherein the distal end is disposed below the bottom portion of the expansion chamber while the proximal end is disposed above the bottom portion of the expansion chamber; and
    a gas source in fluid communication with the proximal end of the gas conduit;
    wherein the expansion chamber is configured to temporarily contain an expansion of wine bubbles during an aeration process.

2. The aerator of claim 1, wherein the expansion chamber is optically transparent or translucent.

3. The aerator of claim 1, including a sealing element attached to the bottom portion of the expansion chamber, wherein the sealing element is configured to seal against an inside surface, a top surface or an outside surface of the opening of the uncorked wine bottle.

4. The aerator of claim 3, wherein the sealing element comprises an elastic or rubber-like material.

5. The aerator of claim 1, including an aeration element attached to the distal end of the gas conduit.

6. The aerator of claim 1, wherein at least a portion of the expansion chamber is in fluid communication with surrounding air.

7. The aerator of claim 1, wherein the top portion of the expansion chamber is larger in cross-sectional area as compared to the bottom portion of the expansion chamber.

8. The aerator of claim 1, wherein the gas source comprises an electrically powered air pump, a manually powered air pump or a pressurized cartridge.

9. The aerator of claim 8, wherein the electrically powered air pump is electrically powered by a battery or by an electrical plug.

10. The aerator of claim 1, including an extension attached to the expansion chamber, the extension configured to extend downwardly around a neck of the uncorked wine bottle.

11. The aerator of claim 1, wherein the gas source is disposed remote from the expansion chamber.

12. The aerator of claim 1, wherein the gas source is attached to a portion of the expansion chamber.

13. An aerator, comprising:
    a gas conduit having a proximal end in fluid communication with a distal end, the distal end configured to be disposed within an inside an uncorked wine bottle and the proximal end configured to be disposed outside the uncorked wine bottle; and
    an expansion chamber configured to engage an opening of the uncorked wine bottle, wherein the expansion chamber is at least partially disposed outside the uncorked wine bottle and wherein the expansion chamber is configured to be in fluid communication with the inside of the uncorked wine bottle and also in fluid communication with surrounding air; and
    wherein the gas conduit is at least partially disposed within the expansion chamber.

14. The aerator of claim 13, including a gas source coupled to the proximal end of the gas conduit where the gas source is configured to provide a gas supply into the proximal end of the gas conduit.

15. The aerator of claim 14, wherein the gas source comprises an electrically powered air pump, a manually powered air pump or a pressurized cartridge.

16. The aerator of claim 15, including a sealing element configured to be disposed between the expansion chamber and the opening of the uncorked wine bottle.

17. The aerator of claim 15, including a sealing element attached to the expansion chamber, wherein the sealing element is configured to seal against an outside surface, a top surface or inside surface of the opening of the uncorked wine bottle.

18. The aerator of claim 13, wherein the expansion chamber is optically transparent or translucent.

19. An aerator, comprising:
    an expansion chamber configured to be in fluid communication with an inside of an uncorked wine bottle, wherein at least a portion of the expansion chamber is disposed outside the uncorked wine bottle and in fluid communication with surrounding air; and a gas conduit attached to the expansion chamber, the gas conduit having a proximal end in fluid communication with a distal end, the distal end configured to be disposed within an inside of the uncorked wine bottle and the distal end comprising an aeration element, and wherein the proximal end of the gas conduit is configured to be disposed outside the uncorked wine bottle.

20. The aerator of claim 19, wherein the expansion chamber is optically transparent or translucent.

21. The aerator of claim 20, including a gas source configured to provide a gas supply into the proximal end of the gas conduit.

22. The aerator of claim 21, including a sealing element configured to be disposed between the expansion chamber and an opening of the uncorked wine bottle.

23. The aerator of claim 22, wherein the sealing element is attached to the expansion chamber, wherein the sealing element is configured to seal against an outside surface, a top surface or inside surface of the opening of the uncorked wine bottle.

* * * * *

UNITED STATES PATENT AND TRADEMARK OFFICE
CERTIFICATE OF CORRECTION

PATENT NO. : 9,321,019 B2
APPLICATION NO. : 14/294157
DATED : April 26, 2016
INVENTOR(S) : Robert A. Stevenson et al.

It is certified that error appears in the above-identified patent and that said Letters Patent is hereby corrected as shown below:

In the Claims

Column 8, line 35, the portion of Claim 13 reading "within an inside an uncorked wine bottle" should read --within an inside of an uncorked wine bottle--.

Signed and Sealed this
Twenty-eighth Day of June, 2016

Michelle K. Lee
*Director of the United States Patent and Trademark Office*